Inventor
Frank B. Keall
By his Attorney

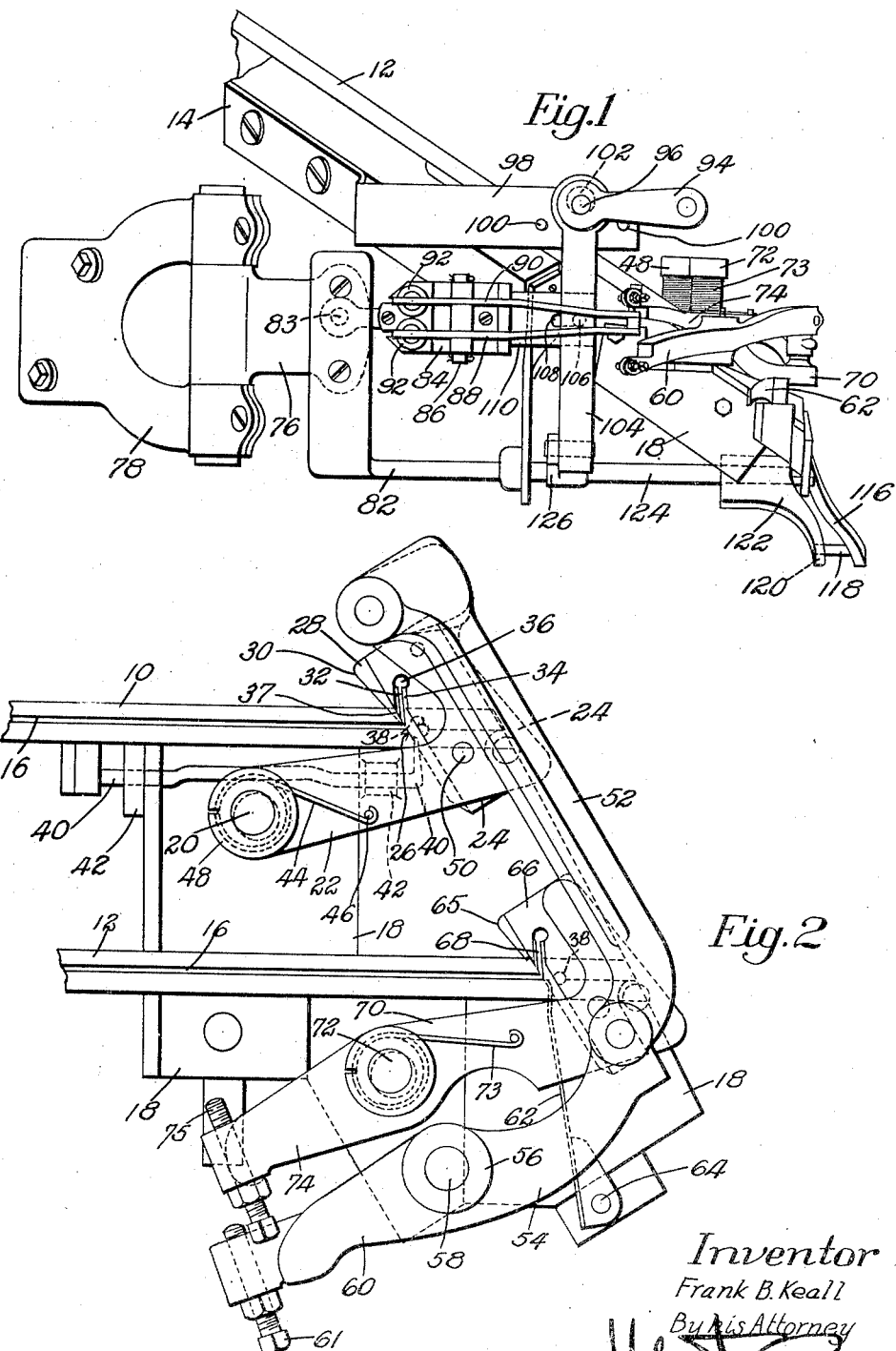

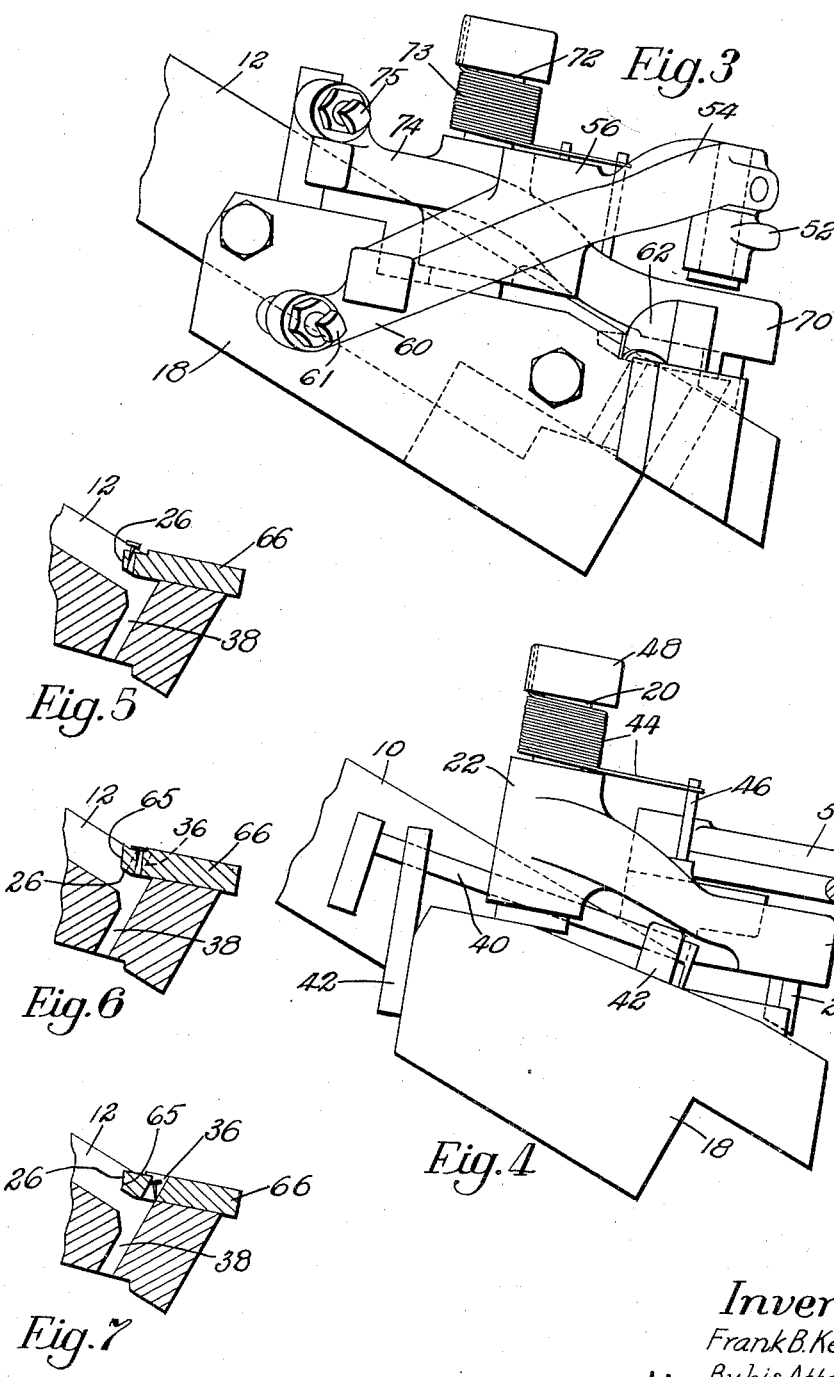

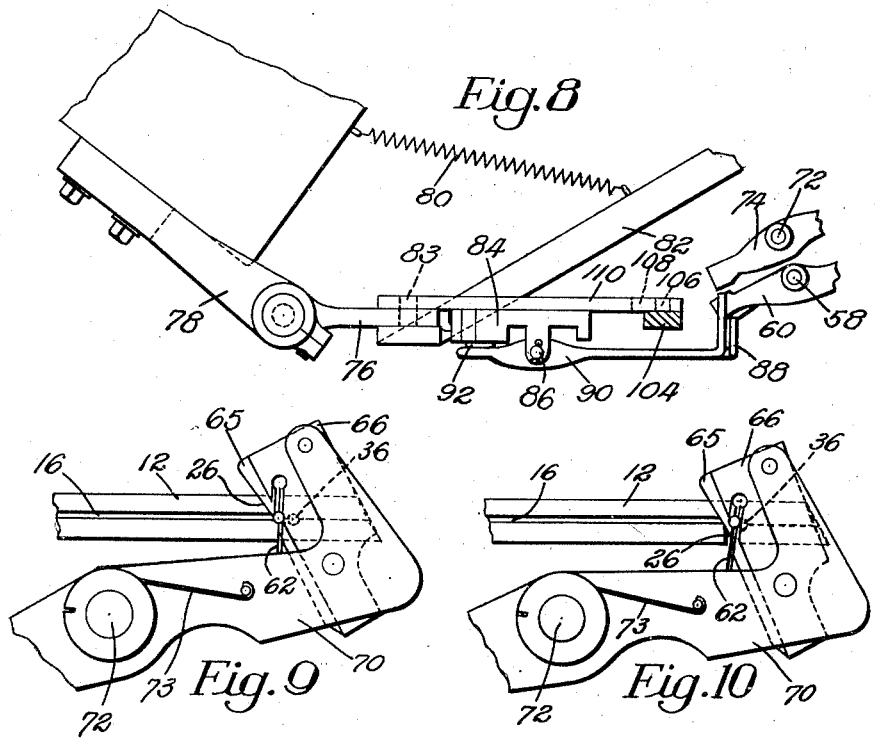
Fig. 8
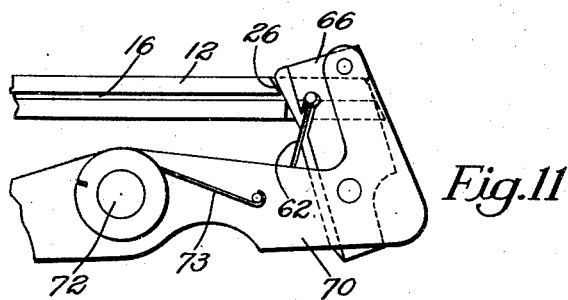
Fig. 9  Fig. 10
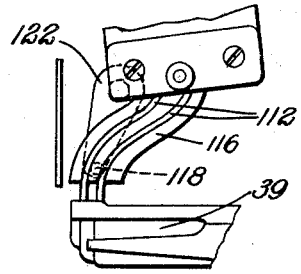
Fig. 11
Fig. 12
Inventor
Frank B. Keall
By his Attorney Dec. 20, 1949 F. B. KEALL 2,491,614
TACK SEPARATING MECHANISM
Filed Jan. 13, 1947 7 Sheets-Sheet 4

Dec. 20, 1949      F. B. KEALL      2,491,614

TACK SEPARATING MECHANISM

Filed Jan. 13, 1947      7 Sheets-Sheet 5

Inventor
Frank B. Keall
By his Attorney

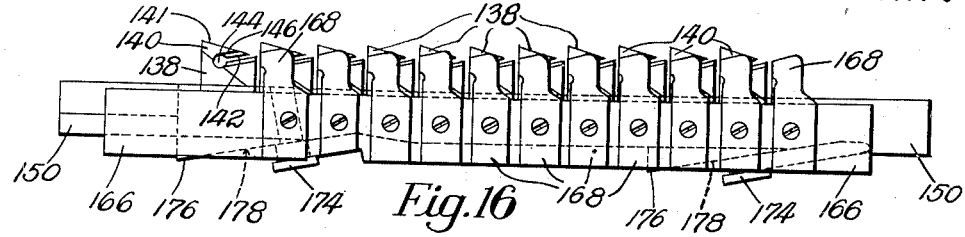
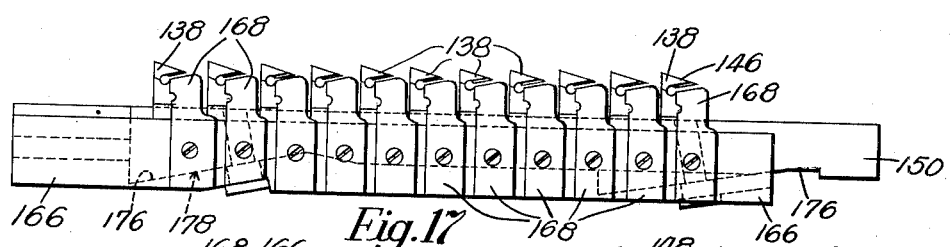
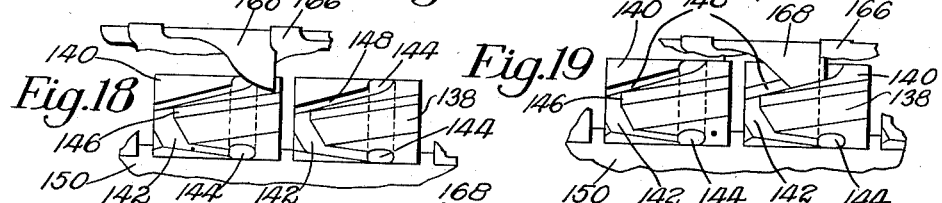
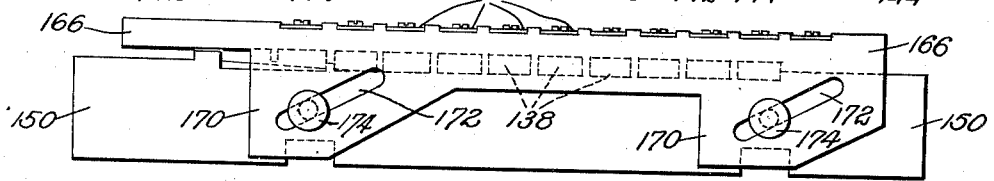
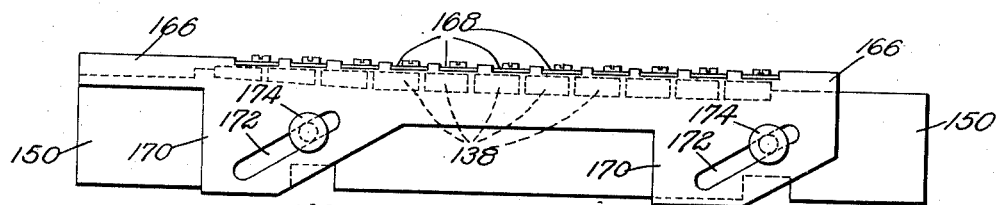
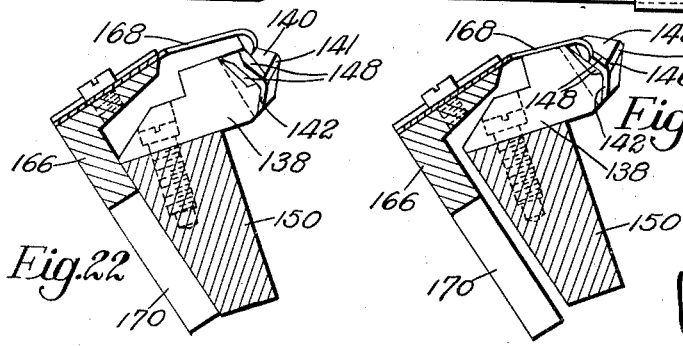
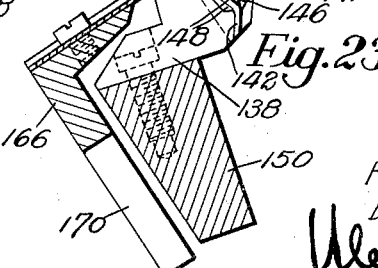

Dec. 20, 1949           F. B. KEALL           2,491,614
TACK SEPARATING MECHANISM
Filed Jan. 13, 1947                         7 Sheets-Sheet 7
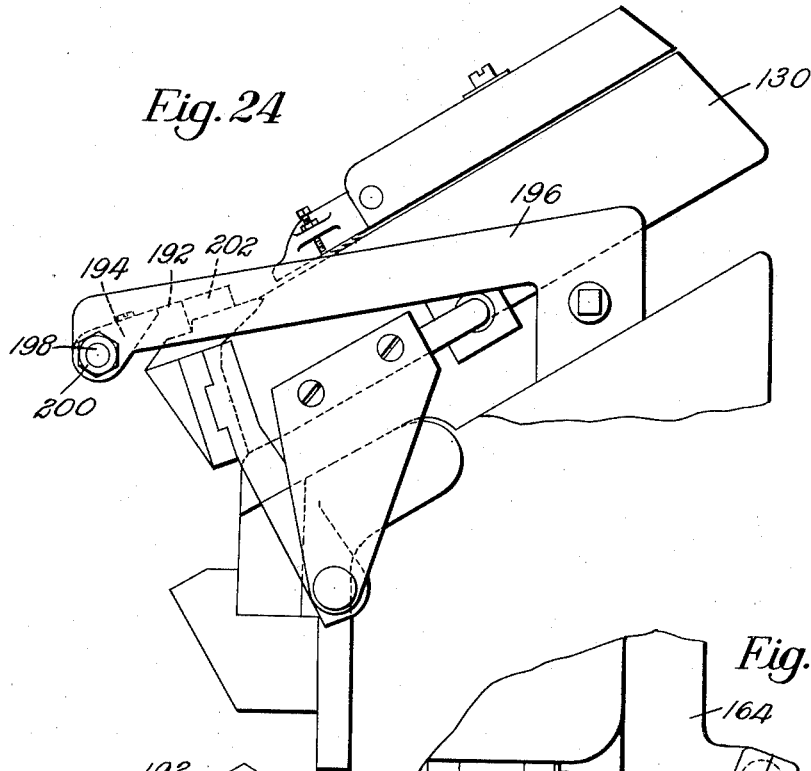
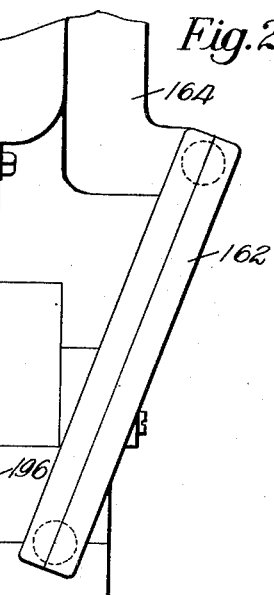
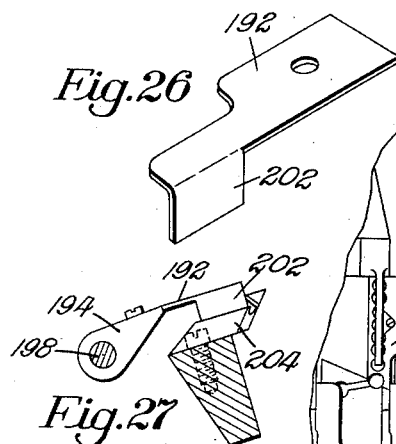
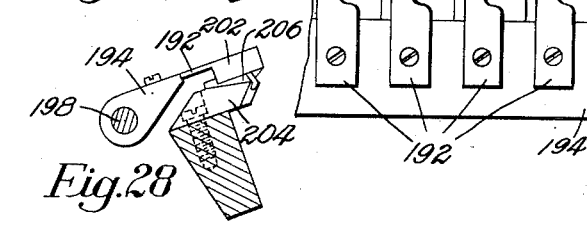
Inventor
Frank B. Keall
By his Attorney Patented Dec. 20, 1949

2,491,614

UNITED STATES PATENT OFFICE 2,491,614

TACK SEPARATING MECHANISM

Frank Bycroft Keall, Swanage, Dorset, England, assignor to United Shoe Machinery Corporation, Flemington, N. J., a corporation of New Jersey Application January 13, 1947, Serial No. 721,685

9 Claims. (Cl. 1—6)

The invention relates to tack separating mechanisms, and is illustrated herein as applied to shoe lasting machines, either of the type in which during one cycle of operations one tack only is separated from a row of tacks in the raceway with which mechanisms of this type are usually provided, or of the type in which a plurality of tacks are separated during one cycle of operations. A machine of the first mentioned type is disclosed, for example, in United States Letters Patent No. 584,744, granted on June 15, 1897, on an application filed in the name of S. W. Ladd et al., this machine being commonly known in the trade as a "Hand Method Lasting Machine." Machines of the other type referred to above in which a plurality of tacks are separated in one cycle are, for example, heel seat lasting machines, such as disclosed in United States Letters Patent No. 1,949,539, granted on March 6, 1934, on an application filed in the name of J. Gouldbourn et al., or toe lasting machines, such as disclosed in United States Letters Patent No. 2,134,148, granted on October 25, 1938, on an application filed in the name of W. T. B. Roberts.

In lasting shoe uppers by machines of the above-mentioned types, and particularly in securing the marginal portion of an upper in lasted relation to a shoe bottom member (e. g., an insole) by means of tacks, it is sometimes desired to use relatively light and short tacks, only some $\frac{3}{16}$" in length in order to avoid as far as possible clinching over at the interior of the shoe a considerable portion of the tack point and also in order to reduce the weight of the metallic fastenings present in the finished shoe.

Such tack separating mechanisms as have previously proved satisfactory for separating heavier and longer tacks of $\frac{1}{4}$" or more in length have not proved equally suitable for separating light and short tacks of the type above referred to. This is apparently due, in a large measure at least, to the fact that the shorter tacks are too light to flow readily down the inclined raceways toward the tack separators and to the further fact that these tacks show a marked tendency to become tilted on their heads within the raceways, thus giving rise to additional difficulties in separating them from the raceways and in delivering them point downward from the raceways into the tack blocks from which they are driven into the work by a reciprocating tack driver.

It is therefore an object of the invention to provide a tack separating mechanism whereby short tacks, such as referred to above, may be readily separated from a row of tacks in the raceway and delivered to the tack inserting mechanism of the machine.

To this end the tack separating mechanism which is illustrated herein in three different forms or embodiments, is provided with a tack supporting member adapted to engage the head of the endmost tack during its separation from the raceway and to prevent tilting or lateral displacement of the tack under the impact of the tack separator. The tack supporting member is arranged to maintain control of the tack while the latter is being picked off the raceway by the tack separator and for this purpose the tack supporting member has a portion arranged to extend into the tack receiving slot in the separator as the latter moves across the lower end of the raceway to cause the slot to traverse past the endmost tack and thus to bring that tack into position to fall from the separator into a tack tube conducting it to the tack block. The arrangement between the tack supporting member and the slot in the separator causes the supporting member to move forward, relatively to the raceway, with the endmost tack during its separation, the tack supporting member thus maintaining contact with the tack not only while the tack is still in the raceway but also after the tack has been separated therefrom and until the tack falls into the tack tube.

These and other features of the invention will now be described in detail in connection with the accompanying drawings and will be pointed out in the appended claims.

In the drawings,

Fig. 1 is a front elevation of one form of a novel tack separating mechanism;

Fig. 2 is a plan view of part of the tack separating mechanism illustrated in Fig. 1;

Fig. 3 is a front elevation of part of the mechanism illustrated in Fig. 2;

Fig. 4 is a front elevation of another part of the mechanism shown in Fig. 2;

Figs. 5, 6 and 7 illustrate successive steps of the separation of a tack from one of the raceways;

Fig. 8 is a plan view of part of the mechanism shown in Fig. 1;

Figs. 9, 10 and 11 are plan views of Figs. 5, 6 and 7 respectively;

Fig. 12 is a side elevation of a tack delivering mechanism associated with the mechanism illustrated in Fig. 1;

Figs. 16 and 17 are plan views of certain parts of the mechanism shown in Fig. 13, with the parts shown in different positions they assume in one cycle of operations;

Figs. 18 and 19 are rear elevations of one of the tack separators and cooperating parts of the mechanisms shown in Fig. 13, the parts being shown in different positions they assume in one cycle of operations;

Figs. 20 and 21 are front elevations of the parts shown in Figs. 16 and 17;

Figs. 22 and 23 are sectional views of a tack separator and corresponding tack supporting member and their supporting parts in different positions they assume during one cycle of operations;

Fig. 24 is a right-hand side elevation of a still further form of the tack separating mechanism;

Fig. 25 is a plan view of part of the mechanism shown in Fig. 24; and

Figs. 26, 27 and 28 are detail views of a tack separator and tack supporting member of the mechanism shown in Fig. 24.

Figure 13:
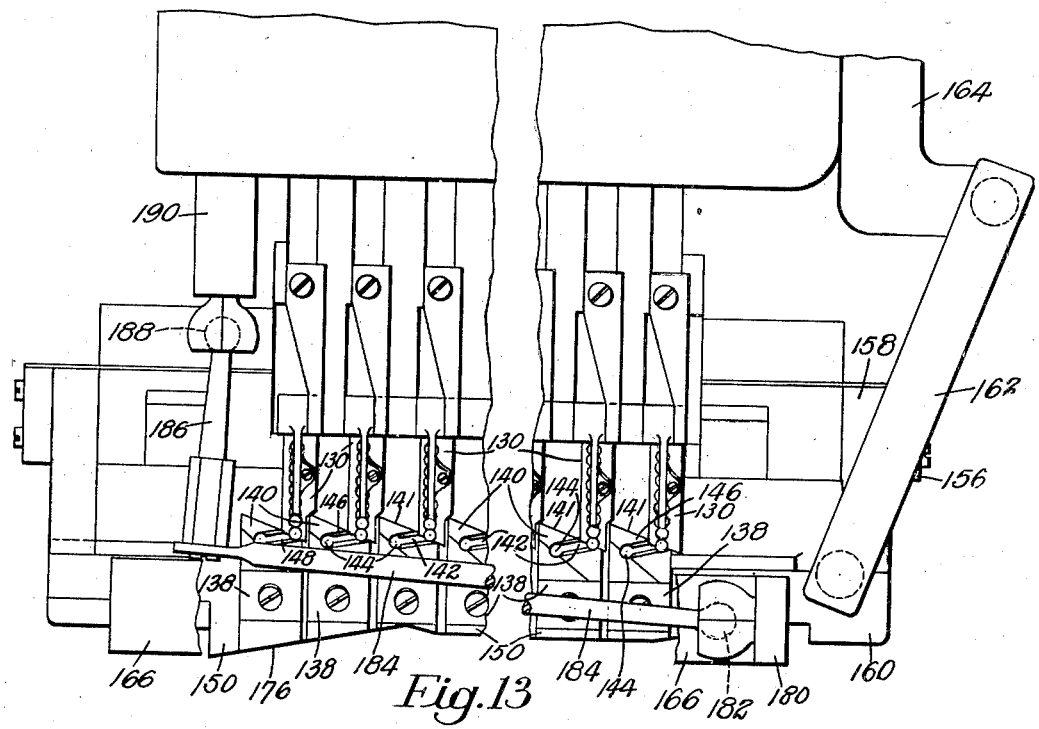
Fig. 13 is a plan view of another form of tack separating mechanism.
Figure 14:
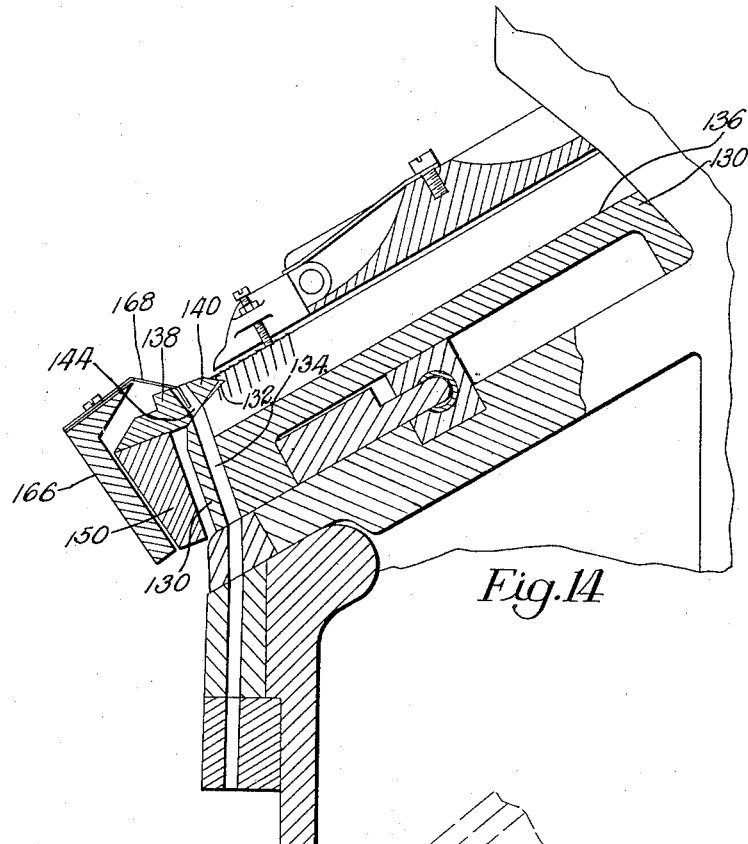
Fig. 14 is a right-hand side elevation, partly in section, of part of the mechanism shown in Fig. 13.

The tack separating mechanism shown in Figs. 1–12 inclusive has two raceways 10 and 12 (Fig. 2) adapted to handle tacks of different lengths. The two raceways are secured in parallel relation on a bracket 14 (Fig. 1) fixed to the machine frame. Each raceway has in it a groove 16 down which the tacks pass one behind the other with their heads resting on the upper face of the raceway. The upper faces of the raceways are inclined downwardly at an angle of about 30° to the horizontal. A block 18 is secured between the delivery end portions of the two raceways. The upper face of the block 18 is at an angle of about 10° to the horizontal. Pivoted on a stud 20 (Figs. 2 and 4) which is secured in the block 18 and is perpendicular to its upper face, is a lever 22 arranged to cause tacks to be separated from the rear raceway 10. The lever 22 extends from the stud 20 toward the delivery end of the raceway. A separator block 24 is secured to the underside of the front end of the lever 22 and thus may be swung about the stud 20 across the end portion of the raceway 10 to separate a tack therefrom. The delivery end portion of the raceway 10 has formed in it a notch 26 extending across the raceway at an angle of about 45° to the raceway as seen in plan, in which notch a portion of the separator block 24 moves. The separator block 24 has a tapered rear portion 28 (Figs. 5–7) which extends into the notch 26. The rear edge 30 (Fig. 2) of the separator block lies obliquely to the length of the raceway at some 45°. A slot 32 extends from the edge 30 forwardly and laterally of the block 24 and is adapted to receive the shank of the endmost tack in the raceway when being separated therefrom, the head of the tack being supported in a recess or groove 34 formed in the block 24 along each side of the slot 32. The slot 32 terminates in a hole 36 passing through the block 24. The hole 36 is large enough to allow the head of the tack to pass through it. The junction between the rear wall of the slot 32 and the rear edge 30 of the block 24 forms a point 37 arranged to enter between the shanks of the two endmost tacks in the raceway as the block 24 moves across the raceway, thus moving the endmost tack out of the raceway and onto the block 24 itself with the head of that tack resting in the recesses 34. When the separator block 24 has completed its tack separating movement the hole 36 comes beneath the tack head and into alinement with a hole 38 in the raceway 10 so that the separated tack passes through these holes and down a tube into a tack block 39 (Fig. 12) of well-known construction from which it is driven into the work by mechanism well known in the art.

To hold the tack when being separated against displacement laterally of the raceway under the impact of the block 24 as the latter is moved across the raceway, a rod 40 (Fig. 2) is mounted for sliding movement lengthwise of the raceway in lugs 42 provided on the block 18. The rod 40 has its forward end portion bent, as shown in Fig. 2, toward the raceway and then downward, as shown in Fig. 4. The down-turned end portion is arranged to engage the head of the foremost tack at the left-hand side thereof (as seen from the front of the raceways 10, 12) and to enter the slot 32 in the separator block 24, as the block 24 moves across the raceway. The downturned end portion of the rod 40 normally lies in contact with the forward end of the raceway just to the left of the endmost tack in the raceway (as seen from the front of the raceway) and thus it engages the tack at that side toward which the block 24 would tend to move it in separating it from the raceway. Just after the point 37 of the separator block 24 has moved behind the endmost tack in the raceway, the slot 32 engages the downturned end of the rod 40, and, owing to the direction of movement of the block 24, the rod is thereby moved lengthwise of the raceway 10. The head of the separated tack comes into engagement with the rod 40 just after the point 37 of the separator block 24 has separated the tack from the next tack. The separated tack is prevented thereby from moving laterally of the raceway with the block 24 and therefore remains stationary within the slot 32 until the block reaches the end of its movement across the raceway. The tack then passes down through the holes 36 and 38. The rear edge 30 of the block 24 lies so close to the end of the raceway 10 that, before the block 24 begins its tack separating movement, the endmost tack in the raceway is in engagement with the rear edge 30 and its head is supported partly by the raceway 10 and partly by the block 24.

The tack immediately following the separated tack is prevented from moving out of the raceway by the rear edge 30 of the separator block 24. It will be noted that during the separation of each tack, the tack passes from the raceway 10 directly onto the separator block 24 and that, owing to the engagement of the rod 40 with the head of the tack, little if any lateral pressure is exerted on the shank of the tack which otherwise might become displaced and trapped between the block 24 and the raceway 10. If such short tacks as previously referred to were to be transferred to a throat plate of conventional type by the action of the separator, the separator would be unable to engage the tacks close to their heads and thus there would be the danger of the tacks becoming tipped on their heads during tack separation.

As has been stated the upper tack supporting face of the raceway 10 is inclined downwardly at an angle of about 30° to the horizontal. The separator block 24 lies at an angle of about 10° to the horizontal, being inclined downwardly in the same direction as the raceway, as shown in Figs. 5, 6 and 7. The pivot stud 20 for the separator lever 22 is perpendicular to the block 24, thus causing the arcuate path of movement of the block 24 to lie in a plane making an angle some 20° to the inclination of the raceway. The slot 32 and hole 36 in the block 24 extend through the block at right angles thereto so that the point of the separator block 24 and the slot 32 are, by reason of the mutual inclination of the block and the raceway, thus arranged readily to engage the shank of the endmost tack. Since the head of that tack is supported partly by the raceway 10 and partly by the block 24 the tack does not hang vertically but with its head slightly in advance of its point, as shown in Fig. 5. Thus its shank is separated from the shank of the next tack and insurance is given that the point of the separator block 24 will move behind the endmost tack and will not disturb the remaining tacks in the raceway. The tack, therefore, when it is in the slot 32, lies at an angle of about 10° to the vertical and drops through the hole 36 substantially at that angle. The hole 38 lies at right angles to the upper face of the raceway and the point of the tack engages the side of the hole remote from the raceway and is thus prevented from dropping on the bottom of the groove 16 in the raceway 10. If the tack were to strike against the bottom of the groove 16 it would quite likely become tipped out of its correct position. As the separator block 24 is returned to its initial position after the separated tack has fallen from it, the rod 40 is moved rearwardly as a result of the cam action of the slot 32 thereon and, after the separator point 37 has moved beyond the groove 16 in the raceway the end of the rod 40 remains in engagement with the rear edge 30 of the separator block 24 which, therefore, retains it in position to engage the head of the next tack in the raceway as the separator picks that tack from the raceway.

A blast of air may be directed on the separated tack to blow it into the tack block 39 by a pump (not shown) operated in time relation to the movement of the separator block 24.

The stud 20 has an eccentric portion on which the lever 22 is mounted so that the lever may be adjusted to adjust the rear edge 30 of the separator block 24 with relation to the notch 26 in the raceway.

The lever 22 is moved to separate a tack by a lever arrangement, hereinafter described, and in the opposite direction by a torsion spring 44 surrounding the stud 20. One end of the spring engages a pin 46 in the lever 22 and the other end engages a hole in a collar 48 secured to the stud 20. A pin 50 in the lever 22 is arranged to engage the side of the raceway 10 to limit the movement of the lever 22 by the spring 44 and an adjustable stop (hereinafter described) is provided to limit movement of the lever 22 in the direction to separate a tack from the raceway. The lever 22 is pivotally connected by a link 52 to one arm 54 of a lever 56 which is pivoted on a stud 58 secured in the block 18. Another arm 60 of the lever 56 is arranged to be actuated by means hereinafter described and carries an adjustable stop screw 61 which, by engagement with the block 18 limits the movement of the lever 56 in a clockwise direction, as viewed in Fig. 2.

The separator arrangement for the front raceway 12 is similar to that associated with the rear raceway 10, except that a thin blade-like member 62, is used instead of the rod 40 to support the head of the endmost tack while the slot in the separator is moving past the tack. The blade-like member 62 extends to the left (as seen from the front of the raceway 12) from close to the left hand side of the groove 16 in the raceway 12 and its left hand end is pivoted at 64 to the block 18. The right hand end of the member 62 lies between the end of the raceway and the rear edge 65 of the separator block 66 and is arranged to enter the slot 68 in the block as the latter swings toward the left and to control the endmost tack in the same manner as the rod 40. The member 62 may swing slightly to and fro as the front separator lever 70 is operated. The lever 70 is also mounted on an eccentric portion of a stud 72 which is secured in the block 18 so that the front separator block 66 may be adjusted relatively to the delivery end of the front raceway 12. The lever 70 also is rotated in one direction by a torsion spring 73 on the stud 72 and has an arm 74 arranged to be actuated by means hereinafter described and carrying an adjustable stop screw 75 which, by engagement with the block 18 limits the movement of the lever 70 in clockwise direction, as viewed in Fig. 2.

The means for actuating the aforesaid arms 60 and 74 comprises an actuating lever 76 (Figs. 1 and 3) pivoted on a fixed bracket 78, the lever being moved in a direction to separate a tack by a tension spring 80. The lever 76 has secured to it an arm 82 which is engaged by a rotary cam (not shown) arranged to allow the lever to be actuated by the spring 80 to cause the separation of a tack from one of the raceways. The lever 76 has pivoted to it at 83 a block 84 to which are pivoted, on a vertical pin 86, two fingers 88 and 90 arranged respectively to engage and operate the arms 60 and 74. The fingers may, when acting upon the arms, yield against relative light springs 92 but these springs are of course stronger than the torsion springs 44 and 73 which act on the separator levers 22 and 70.

In order to enable the operator of the machine to select the raceway from which tacks are to be separated a hand lever 94 is pivoted on a stud 96 secured in a fixed bracket 98. The hand lever 94 may be rotated through 180° between stop pins 100 in the bracket 98 and has on it an eccentric portion 102 on which is mounted a downwardly extending link 104 which is raised or lowered when the hand lever is moved from one position or the other. The link 104 has secured on it a pin 106 arranged to engage a recess 108 in a plate 110 secured to the block 84. Thus the block 84 is raised or lowered by the link 104. The arrangement is such that when the link 104 is in one position, one of the fingers 88 and 90 acts upon one of the arms 60 and 74 while the other finger, although moved by the lever 76, is out of alinement with and does not operate upon the other arm, and when the link 104 is in its other position, the other arm associated with the separators is operated.

The separated tacks pass down one or the other of two tubes 112 (Fig. 12) to a position where they drop or are blown into the tack block 39. The end portions of the tubes 112 adjacent the separators are secured in opposite end portions of a lever (not shown) which is pivoted to the block 18 beneath the delivery end of the raceways. When the lever carrying the tubes 112 is swung (as will be described) the upper end of one or the other of the tubes is moved close up against the lower end of the holes 38 in the end portions of the raceways down which the separated tacks pass to form a continuous passage for the tacks. The lower end portions of the tubes 112 are secured in a tube block 116 (Fig. 12) which has extending rearwardly from it a pin 118 engaged by a slot 120 (Fig. 1) in the lower end of an arm 122 secured on a spindle 124 rotatably mounted in fixed bearings. The spindle 124 has secured on it a second arm 126 which is pivotally connected to the link 104. Thus, when the hand lever 94 is moved from one position to the other not only is a change made in the raceway from which tacks are separated but the upper end of the appropriate tube 112 is brought close up to its hole 38 in the raceway and also the delivery end of that tube is moved into correct position to deliver the separated tacks to the tack block 39, in that the movement of the tube block 116 caused by the arm 122 also causes a swinging movement of the lever to which the upper ends of the tubes 112 are secured.

If, during the operation of the machine, the separation of a tack is prevented owing to movement of the separator block being prevented by a bent or misplaced tack or for any other reason, the spring 92 will yield and prevent damage to the machine parts although the actuating lever 76 will complete its movement.

The machine in connection with which the tack separating mechanism has been described is arranged to conform an upper to its last by pulling the upper around the last step-by-step and fastening the margin of the upper to an insole on the last bottom by means of short tacks. It may be desirable to use short tacks in other shoe upper conforming machines, for example heel seat lasting machines or toe lasting machines in which a plurality of tacks are simultaneously separated and then driven into the work. Machines of that type are disclosed, for example, in United States Letters Patent No. 1,949,539, granted on March 6, 1934, on an application of J. Gouldbourn et al. and United States Letters Patent No. 2,134,148, granted on October 25, 1938, on an application of W. T. B. Roberts.

In the separation of short tacks in machines of the type last referred to it may be difficult to employ the above described form of tack separating mechanism, since the raceways lie too close together for the separating mechanism to operate efficiently.

Accordingly, there is illustrated in Figs. 13 to 23, inclusive, a modified form of the tack separating mechanism especially suitable for machines of the type disclosed in the last mentioned two patents. The eleven raceways 130 of this mechanism also are inclined downwardly at an angle of about 30° to the horizontal. Each raceway 130 has at its lower end portion a notch 132 (Fig. 14) which is located laterally across the raceway at an angle of about 20° (as seen from above). The notch 132 extends toward the upper end of the raceway and its upper wall is at an angle of about 30° to the upper face of the raceway and the lower wall is at an angle of about 50° to the upper wall of the notch. Each raceway 130 has in its front end portion a hole 134 passing downwardly through the raceway from the lower wall of the notch 132. The hole 134 is at an angle of about 100° to the upper face of the raceway and the tack guiding groove 136 of the raceway ends in the hole.

Arranged to move laterally across the front end portion of each raceway is a separator block 138, there being eleven such blocks similarly arranged in relation to the raceway with which each block is associated. The separator blocks 138 are all moved simultaneously across the raceways to separate the endmost tack from each raceway and owing to the angle of the notches 132 across the raceways the blocks 138 are moved forwardly of the raceways as they move across them so that their movement across the raceways is at least substantially parallel to the notches 132.

Each separator block 138 has a tapering rear portion 140 (Fig. 14) which is so shaped as to fit substantially into the notch 132. The sides of the block 138 are parallel to the raceway. The rear edge 141 of the block extends at an angle of about 20° to the sides.

The rear portion 140 of the block 138 has formed in it a slot 142 which extends inwardly of the block at an angle from the right hand end of its rear edge 141. At the inner end of the slot 142 is a hole 144 passing through the block so that as the slot travels past the endmost tack in the raceway with the shank of the tack in the slot the tack eventually falls through the hole 144. The slot 142 passes through the block 138 at right angles to its upper face and the hole 144 passes through the block, downwardly and rearwardly thereof, at an angle of about 75° to its upper face.

The rear face of the slot 142 and the rear edge 141 of the block 138 form a point 146 arranged to enter between the endmost tack and the next tack to separate the endmost from the remainder of the tacks in the raceway. The upper face of the block 138 has formed in it a recess 148 extending along each side of the slot 142, in which recess the head of the tack is supported during movement of the block past the tack until the tack drops through the hole 144.

Figure 15:
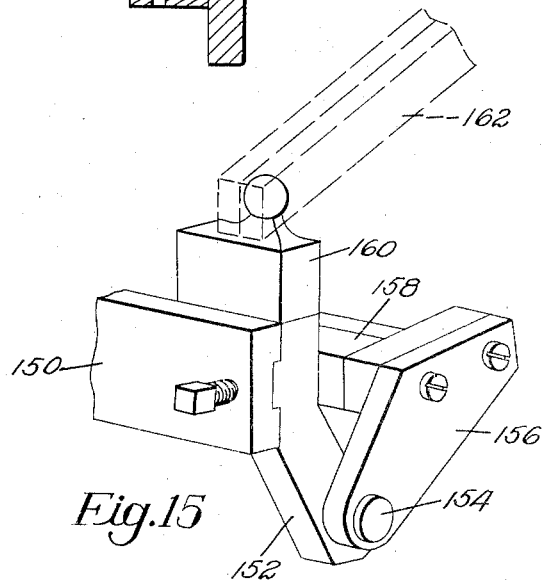
Fig. 15 is an angular view of part of the mechanism shown in Fig. 13.

The eleven separator blocks 138 are secured on the upper face of a bar 150 (Figs. 13 to 17) extending across the front ends of the raceways. The bar 150 is secured at its ends to downwardly extending arms, one of which is shown at 152 (Fig. 15). The lower end portions of the arms 152 are pivotally secured by axially alined horizontal studs 154 to brackets 156. The axes of the pivot studs 154 are parallel to the front ends of the raceways and lie below the top of the raceways and a short distance rearward of a line passing through the axes of the holes 134 in the raceways. The separator blocks 138 as they are moved across the raceways are also moved forwardly about the pivots 154 so that the rear edges of the blocks move along the notches 132. The brackets 156 are secured on the ends of a reciprocating separator actuating slide 158 commonly used in tack separating mechanisms of this type.

The separator bar 150 has secured to its right hand end a block 160 which has a ball joint with a guiding link 162 (Figs. 13 and 15) extending rearwardly and being connected by another ball joint to a fixed arm 164. When the separator bar 150 is in its left hand position (Fig. 13) the link 162 lies (when viewed from above) at an angle of about 70° to the separator bar and extends from the arm 164 to the left. When the bar 150 is in its right hand position, after the endmost tacks have been separated from the raceways, the link 162 lies (when viewed from above) at an angle of about 75° to the bar 150 and extends from the arm 164 to the right. As, therefore, the separator bar 150 is moved from its left hand position to its right hand position, the link 162 causes the bar 150 to swing forwardly about the pivots 154 so that the rear edges of the separator blocks 138 move across the raceways along the notches 132.

The separator bar 150 has mounted on its front face a tack finger bar 166 (Figs. 14, 20 and 21) parallel to the separator bar. The tack finger bar 166 has secured on its upper face eleven tack fingers 168 arranged, as will hereinafter appear, to enter the slots 142 in the separator blocks 138